United States Patent
Kato et al.

[11] Patent Number: 6,011,609
[45] Date of Patent: Jan. 4, 2000

[54] METHOD OF MANUFACTURING LCD BY DROPPING LIQUID CRYSTALS ON A SUBSTRATE AND THEN PRESSING THE SUBSTRATES

[75] Inventors: Yoshinori Kato, Kyungki-do; Kun-jong Lee, Seoul; Gyo-seung Ku, Kyungki-do, all of Rep. of Korea

[73] Assignee: Samsung Electronics Co., Ltd., Rep. of Korea

[21] Appl. No.: 08/943,053

[22] Filed: Oct. 2, 1997

[30] Foreign Application Priority Data

Oct. 5, 1996 [KR] Rep. of Korea .................. 96-44122

[51] Int. Cl.⁷ .................. G02F 1/1339; G02F 1/1341
[52] U.S. Cl. .................. 349/190; 349/153; 349/189
[58] Field of Search .................. 349/187, 189, 349/190, 153, 155, 154

[56] References Cited

U.S. PATENT DOCUMENTS

| | | | |
|---|---|---|---|
| 5,276,541 | 1/1994 | Terada et al. | 349/190 |
| 5,548,429 | 8/1996 | Tsujita | 349/190 |
| 5,684,556 | 11/1997 | Shimamune | 349/190 |
| 5,828,435 | 10/1998 | Kato et al. | 349/190 |

FOREIGN PATENT DOCUMENTS 1-54420  3/1989  Japan .

Primary Examiner—William L. Sikes
Assistant Examiner—Toan Ton
Attorney, Agent, or Firm—Myers Bigel Sibley & Sajovec

[57] ABSTRACT

Liquid crystal displays are manufactured by dropping liquid crystals on at least one of a pair of liquid crystal display substrates and then placing the pair of liquid crystal display substrates adjacent one another, with the liquid crystals therebetween. The pair of liquid crystal display substrates is pressed toward one another, to thereby discharge excess liquid crystals from between the liquid crystal display substrates. The pair of liquid crystal substrates is then sealed to retain the liquid crystals therebetween. Accordingly, by not requiring the use of injection of liquid crystals, high vacuum processing is not required. Moreover, the number of processing steps can be reduced compared to conventional liquid crystal display manufacturing methods.

11 Claims, 3 Drawing Sheets

METHOD OF MANUFACTURING LCD BY DROPPING LIQUID CRYSTALS ON A SUBSTRATE AND THEN PRESSING THE SUBSTRATES

FIELD OF THE INVENTION

This invention relates to liquid crystal displays, and more particularly to methods of manufacturing liquid crystal displays.

BACKGROUND OF THE INVENTION

Liquid crystal displays (LCDs) are widely used in electronic calculators, games, notebook computers and televisions. Liquid crystal displays are generally flat and light, can be driven by low voltages and can consume low power.

Referring now to FIG. 1, a cross-sectional view of a liquid crystal display is shown. As shown, the liquid crystal display includes a pair of liquid crystal display substrates, also referred to herein as upper and lower substrates 2 and 2' respectively. A common electrode 3 is included on the inner surface of the upper substrate 2 and a scanning electrode 3' is included in the inner surface of the lower substrate 2'. Polarizing plates 1 and 1' are included on the outer surfaces of the upper and lower substrates 2 and 2' respectively. Alignment layers 4 and 4' are also included on the common electrode 3 and the scanning electrode 3' respectively.

Continuing with the description of FIG. 1, spacers 6 are included between the alignment layers 4 and 4' so as to maintain the upper and lower substrates 2 and 2' in parallel with each other and spaced apart by a predetermined spacing. Liquid crystals 7 are contained between the substrates. A seal 5 maintains the liquid crystals between the substrates 2 and 2'.

FIG. 2 is a flow chart illustrating conventional methods for manufacturing liquid crystal displays. As shown in FIG. 1, at Step 10, the upper and lower substrates 2 and 2', including the electrodes 3 and 3', are cleaned. The cleaning can prevent the surfaces of the substrate from being contaminated. The cleaning Step 10 may include ultrasonic wave washing, high temperature drying and cooling. Alignment layers 4 and 4' are then formed at Step 12. In particular, a polyimide (PI) resin composition is coated on the surfaces of the substrates 2 and 2' to a thickness of about 600 Å. Then, the solvent in the polyimide resin composition is evaporated by heating the substrates 2 and 2', to thereby harden the alignment layers 4 and 4'.

Then, at Step 14, a rubbing process is performed on the surfaces of the alignment layers 4 and 4'. The rubbing process allows liquid crystal molecules to be aligned in a uniform direction upon injection as described below.

At Step 16, a cleaning process is performed to remove particles that are generated during the rubbing Step 14. Spacers 6, having a diameter of about 5 μm, are scattered on one of the substrates at Step 18. The spacers act to maintain a uniform distance when the upper and lower substrates are joined as described below. At Step 20, a sealing agent 5 is printed or otherwise formed on at least one of the substrates. The sealing agent may be formed by printing using a seal mask or a seal spacer.

Then, referring to Step 22, the upper and lower substrates 2 and 2' are joined and then uniformly pressed together at Step 24 to main a uniform cell gap. The seal 5 is then hardened by heating at Step 26.

Then, liquid crystals 7 are injected into the gap between the adjacent substrates 2 and 2' at Step 28. The liquid crystals may be injected by wetting one end of the substrates with the liquid crystals in a vacuum chamber and then releasing the vacuum to inject the liquid crystals into the gap between the upper and lower substrates through a liquid injection hole. Thus, the liquid crystal injection process utilizes the pressure difference between the inside and the outside of the LCD panel to inject the liquid crystals.

During injection of the liquid crystals in Step 28, the substrates may become separated from one another so that the separation distance between the panels is larger than the diameter of the spacers 7. Accordingly, the space between the two substrate may become nonuniform. In order to obtain a uniform spacing, the substrates are pressed together under a pressure of about 0.5 kg/cm$^2$ at Step 30. Then, the injection hole through which the liquid crystal was injected is closed. Finally, the panel is cleaned at Step 32 and polarizing plates 1 and 1' are formed on the outer surfaces of the two substrates at Step 34.

As described above, conventional manufacturing of liquid crystal displays may be complicated because of the large number of processing steps that may be involved. Moreover, since pressure differences are used to inject liquid crystals, it is desirable for the chamber to be under high vacuum. The need to provide high vacuum may involve long pump-down times and may therefore slow the manufacturing process. Accordingly, due to the large number of steps and the high vacuum processing, the entire process may be lengthy.

SUMMARY OF THE INVENTION

It is therefore an object of the present invention to provide improved methods of manufacturing liquid crystal displays.

It is another object of the present invention to provide liquid crystal display manufacturing methods that can be relatively uncomplicated and that can be performed rapidly.

It is still another object of the present invention to provide liquid crystal display manufacturing methods that do not require high vacuum processing.

These and other objects are provided according to the present invention by liquid crystal display manufacturing methods that include the steps of dropping liquid crystals on at least one of a pair of liquid crystal display substrates and then placing the pair of liquid crystal display substrates adjacent one another, with the liquid crystals therebetween. The pair of liquid crystal display substrates is pressed toward one another, to thereby discharge excess liquid crystals from between the liquid crystal display substrates. The pair of liquid crystal substrates is then sealed to retain the liquid crystals therebetween. Accordingly, by not requiring the use of injection of liquid crystals, high vacuum processing is not required. Moreover, the number of processing steps can be reduced compared to conventional liquid crystal display manufacturing methods.

Prior to dropping the liquid crystals on the liquid crystal display substrates, the liquid crystal substrates are prepared. They may be prepared by forming an alignment layer on each of the liquid crystal display substrates and rubbing the alignment layers. Spacers are then scattered on at least one of the alignment layers, and a sealing layer is formed on at least one of the liquid crystal substrates.

The pressing and sealing steps are preferably performed at subatmospheric pressure, but not at high vacuum. The liquid crystal display substrates preferably are pressed toward one another until stopped by the spacers. The sealing step is preferably performed by heating the pair of liquid crystal displays to form the seal. After the sealing step, polarizing plates may be formed on each of the liquid crystal display substrates, opposite the liquid crystals, and the liquid crystal display can be completed.

DETAILED DESCRIPTION OF PREFERRED EMBODIMENTS

Figure 1:
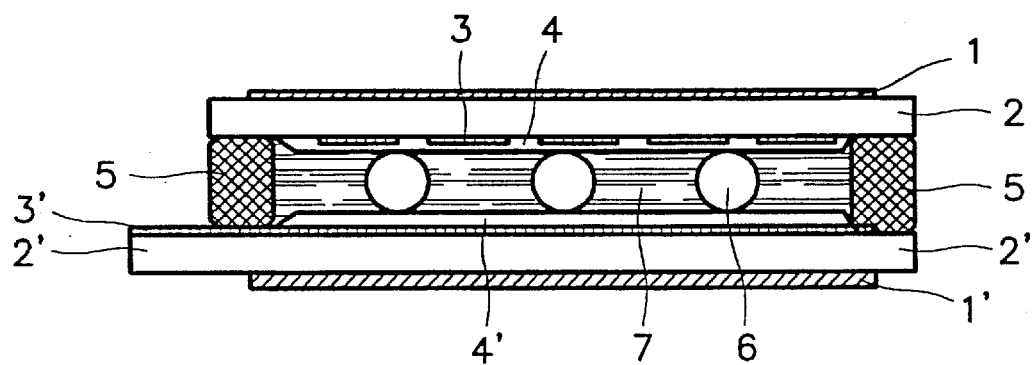
FIG. 1 is a cross-sectional view of a conventional liquid crystal display.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will also be understood that when a layer is referred to as being "on" another layer, region or substrate, it can be directly on the other layer, region or substrate, or intervening layers or regions may also be present.

Figure 2:
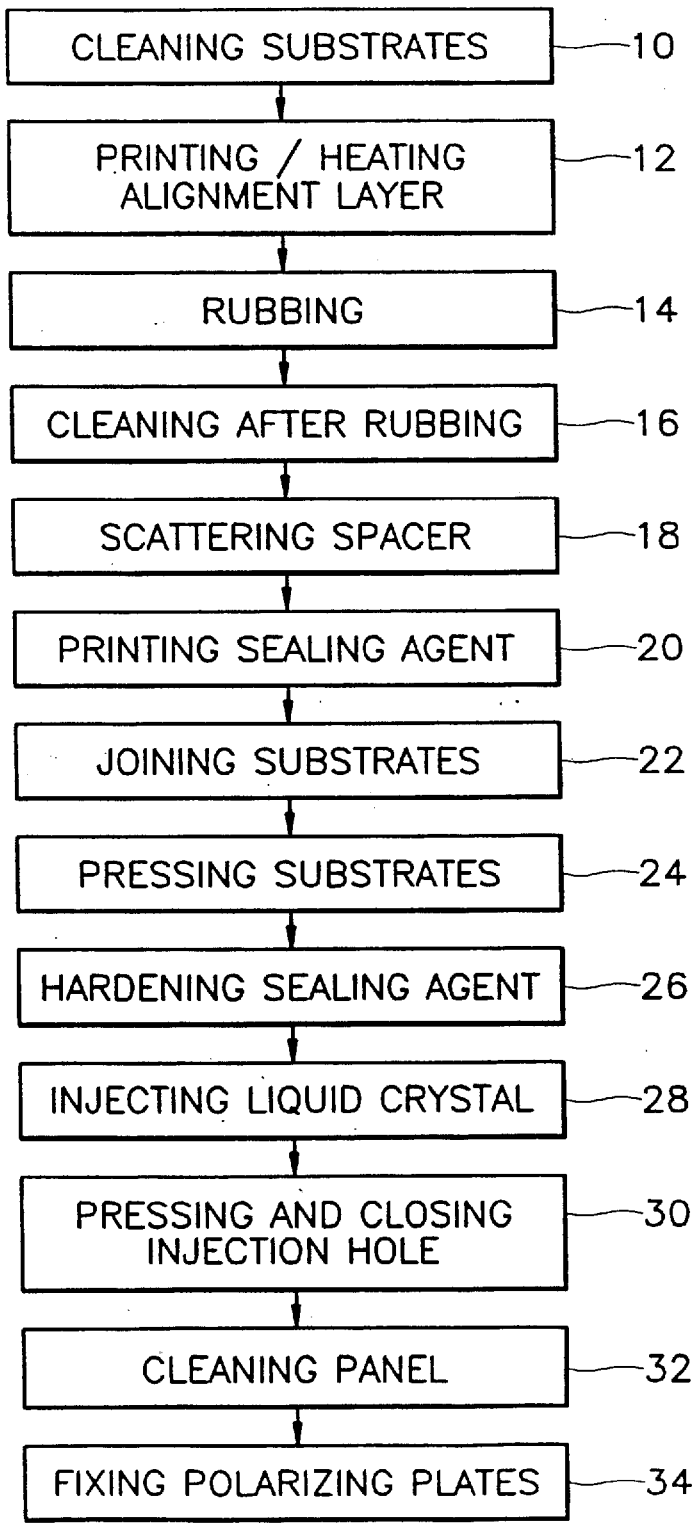
FIG. 2 is a flow diagram illustrating a conventional method of manufacturing a liquid crystal display as shown in FIG. 1.
Figure 3:
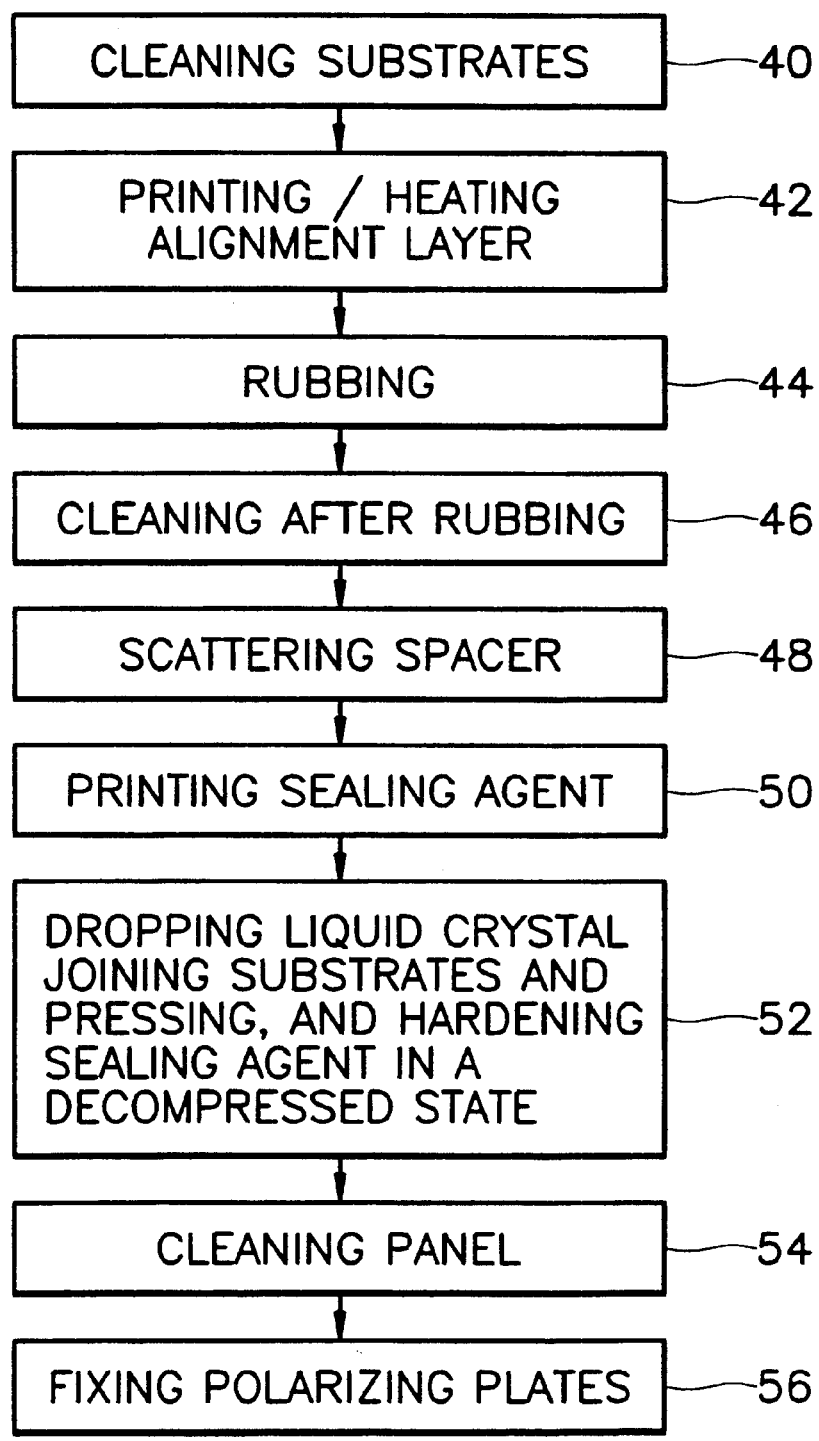
FIG. 3 is a flow diagram illustrating methods of manufacturing liquid crystal displays of FIG. 1, according to the present invention.

FIG. 3 is a flow diagram illustrating methods of manufacturing liquid crystal displays according to the present invention. As shown in FIG. 1, a common electrode 3 and a scanning electrode 3' are formed on a pair of liquid crystal display substrates 2 and 2' respectively. The common electrode 3 and the scanning electrode 3' may be stripe-type electrodes, for example having a width of about 330 μm. The pitch from one electrode to another may also be about 330 μm. The electrodes may be formed of a transparent conductive material, such as an indium tin oxide (ITO) thin film. Then, referring to FIG. 3, the substrates are cleaned at Step 40, an alignment layer is printed and heated at Step 42, the alignment layers are rubbed at Step 44 and cleaned at Step 46, spacers are scattered on at least one of the alignment layers at Step 48, and a sealing agent (also referred to as a sealing layer) is printed on at least one of the substrates at Step 50. Since Steps 40, 42, 44, 46, 48 and 50 correspond to Steps 10, 12, 14, 16, 18 and 20 respectively of FIG. 2, they will not be described in detail again.

Then, at Step 52, both substrates are installed in a vacuum chamber. The vacuum chamber can include a first portion through which liquid crystal is dropped, a second portion in which the substrates are placed adjacent one another, and a third portion in which the substrates are pressed and heated. The operations that are performed in Step 52 will now be described in detail.

First, the substrates are put in the chamber and the chamber is closed and decompressed. Although the chamber is decompressed, a high vacuum need not be produced in the chamber. For example, a pressure of 20 Torr may be maintained, which is higher than the vacuum state that is generally used to inject liquid crystals into a gap between liquid crystal display substrates.

Then, the liquid crystals are dropped onto at least one of the pair of liquid crystal display substrates, while under vacuum. The substrates are then placed adjacent one another, with the liquid crystals and the spacers therebetween. Then, surplus liquid crystals are discharged by pressing the pair of liquid crystal display substrates toward one another. The liquid crystal substrates are then sealed by hardening the sealing agent using a thermal treatment.

The chamber is then restored to atmospheric pressure. The substrates are then cleaned at Step 54, and the polarizing plates are fixed on the outer surfaces of the substrates at Step 56. Steps 54 and 56 correspond to conventional Steps 32 and 34 of FIG. 2 and need not be described again.

It will also be understood that although the steps of dropping liquid crystals, placing the pair of liquid crystal display substrates adjacent one another and pressing the pair of liquid crystal display substrates one another may be performed in a single processing chamber, they also may be performed in separate processing chambers. Moreover, the sealing agent may also be coated in the processing chamber and may be sealed in the processing chamber, depending upon the sealing agent that is used. For example, for sealing agents that can be hardened by ultraviolet rays, the sealing agent can be formed in the same chamber and hardening time may be reduced because a heater is not needed to heat the substrates.

Accordingly, compared to the prior art, the number of processing steps may be reduced. In particular, the step of injecting liquid crystal under high vacuum, pressing the substrates, closing an injection hole and hardening the sealing agent may be replaced by the steps of dropping liquid crystal, placing the substrates adjacent one another, pressing the substrates and hardening the seal. In conventional manufacturing, long times may be needed to obtain the high vacuum state that is used to inject the liquid crystal. In contrast, in the present invention, since the pressure need not be a high vacuum, but rather can be in the range of about 20 Torr, the processing time may be shortened to one-tenth that of conventional manufacturing. Accordingly, manufacturing costs may be reduced due to the simplified processing and less strenuous vacuum processing requirements.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of manufacturing a liquid crystal display comprising the steps of:
   dropping liquid crystals on at least one of a pair of liquid crystal display substrates;
   placing the pair of liquid crystal display substrates adjacent one another, with the liquid crystals therebetween;
   pressing the pair of liquid crystal display substrates toward one another to thereby discharge excess liquid crystals from between the liquid crystal display substrates; and
   sealing the pair of liquid crystal substrates to retain the liquid crystals therebetween.

2. A method according to claim 1 wherein the dropping step is preceded by the step of preparing the pair of liquid crystal substrates by performing the following steps:
   forming an alignment layer on each of the liquid crystal display substrates;
   rubbing the alignment layers;
   scattering spacers on at least one of the alignment layers; and forming a sealing layer on at least one of the liquid crystal substrates.

3. A method according to claim 1 wherein the pressing and sealing steps are performed at sub-atmospheric pressure.

4. A method according to claim 1:

wherein the placing step is preceded by the step of scattering spacers on at least one of the liquid crystal display substrates;

wherein the placing step comprises the step of placing the pair of liquid crystal display substrates adjacent one another, with the liquid crystals and spacers therebetween; and wherein the pressing step comprises the step of pressing the pair of liquid crystal display substrates toward one another until stopped by the spacers.

5. A method according to claim 1 wherein the sealing step comprises the step of heating the pair of liquid crystal displays.

6. A method according to claim 1 wherein the sealing step is followed by the step of forming polarizing plates on each of the liquid crystal display substrates, opposite the liquid crystals.

7. A method of manufacturing a liquid crystal display comprising the steps of:

forming an alignment layer on each of a pair of liquid crystal display substrates;

rubbing the alignment layers;

scattering spacers on at least one of the alignment layers;

forming a sealing layer on at least one of the liquid crystal substrates;

dropping liquid crystals on at least one of the alignment layers;

placing the pair of liquid crystal display substrates adjacent one another, with the liquid crystals and spacers therebetween;

pressing the pair of liquid crystal display substrates toward one another to thereby discharge excess liquid crystals from between the liquid crystal display substrates; and sealing the pair of liquid crystal substrates to retain the liquid crystals therebetween.

8. A method according to claim 7 wherein the pressing and sealing steps are performed at sub-atmospheric pressure.

9. A method according to claim 7 wherein the pressing step comprises the step of pressing the pair of liquid crystal display substrates toward one another until stopped by the spacers.

10. A method according to claim 7 wherein the sealing step comprises the step of heating the pair of liquid crystal displays.

11. A method according to claim 7 wherein the sealing step is followed by the step of forming polarizing plates on each of the liquid crystal display substrates, opposite the liquid crystals.

* * * * *